J. HARRINGTON.

Machine for Pulling Flax.

No. 61,422.
Patented Jan'y 22, 1867.

Witnesses:

Inventor:

United States Patent Office.

JOHN HARRINGTON, OF MENOMONEE, WISCONSIN.

Letters Patent No. 61,422, dated January 22, 1867.

IMPROVEMENT IN MACHINE FOR PULLING FLAX.

The Schedule referred to in these Letters Patent and making part of the same.

TO ALL WHOM IT MAY CONCERN:

Be it known that I, JOHN HARRINGTON, of Menomonee, in the county of Dunn, and State of Wisconsin, have invented a new and improved Machine for Pulling Flax; and I do hereby declare that the following is a full, clear, and exact description thereof, which will enable others skilled in the art to make and use the same, reference being had to the accompanying drawings, forming part of this specification, in which—

Figure 1:
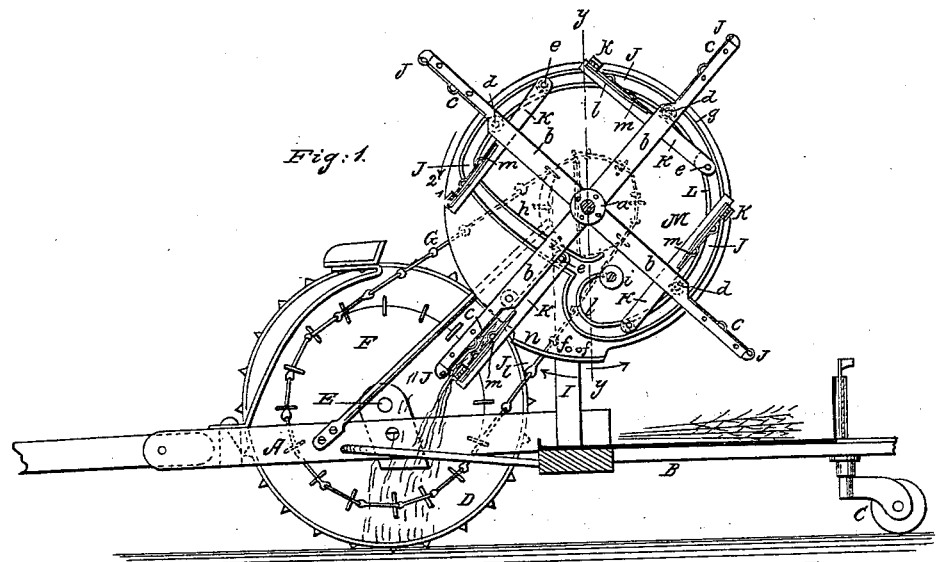
Figure 2:
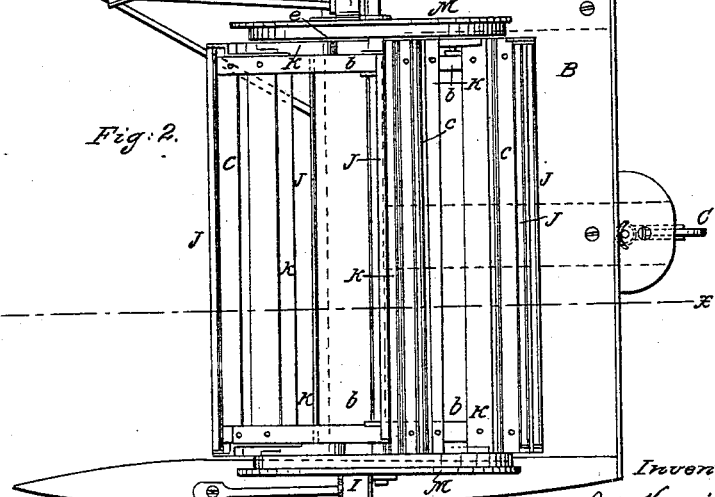

Figure 1 is a side sectional view of my invention, taken in the line $x\ x$, fig. 2.

Figure 2, a plan or top view of the same.

Figure 3:
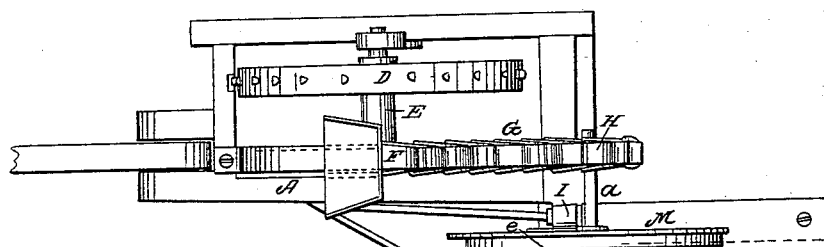
Figure 3:
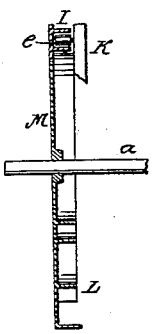

Figure 3, a section of one of the stationary cams, taken in the line $y\ y$, fig. 1.

Similar letters of reference indicate like parts.

This invention relates to a new and improved machine for pulling standing flax, for the purpose of harvesting the same, and it consists in the employment or use of a reel provided with clamps, and arranged in such a manner that it will rotate as the machine is drawn along, and grasp the flax, draw it out of the earth, and deposit it upon the platform.

A represents the main frame of the machine, and B the platform attached thereto, the platform being supported by caster-wheels, C, and the main frame supported by a driving-wheel, D. These parts are arranged similar to those of an ordinary grain-harvester. On the axle E of the driving-wheel D there is a toothed wheel, F, from which a reel is driven by a chain, G, said chain passing around a toothed wheel, H, on one end of the shaft $a$ of the reel. This reel is composed of the shaft $a$, the bearings of which are attached to uprights, I I, arms, $b$, which project radially from the shaft $a$, four near each end, and plates, $c$, which are secured to the ends of the arms $b$. J represents movable plates which, in connection with the plates $c$ of the arms $b$, form clamps to grasp the standing flax. These plates J are attached to the outer parts of the arms K, which are pivoted to the arms $b$ of the reel, as shown at $d$, and the inner ends of the arms K have friction-rollers, $e$, upon them, which are fitted and work in cam-shaped grooves, L, at the inner sides of circular plates, M, attached to the uprights I I, said plates being attached to the uprights by means of a screw passing through any one of a series of holes, $f$, in the plates (see fig. 1) to admit of a certain degree of adjustment of the same in a circumferential direction, as indicated by the arrows 1. The shape of the grooves L at the inner sides of the plates M is shown clearly in fig. 1, one portion, $g$, of which is a part of a circle, a portion, $h$, straight, and a portion, $i$, a half of a small circle. These cam-shaped grooves work the plates J as the reel rotates in the direction indicated by the arrow 2. When the rollers $e$ of the arm K are in the circular parts $g$ of the grooves L, the plates J are held at right angles with the plates $c$, and as the rollers $e$ enter the straight portions, $h$, the plates J are brought down in contact with the plates $c$, and grasp the top of the flax, pull it out of the ground, and carry it up on the platform B, at which time the rollers $e$ enter the part $i$ of the small half circle, and the plates J are forced outward from the plates $c$ at right angles therewith, so that the flax will be released, the plates J being retained in that position while the rollers $e$ pass around in the parts $g$ of the grooves L, and until said rollers pass into the parts $h$ of the grooves, when the plates again grasp the flax, pull it out of the ground, and discharge it upon the platform. It is necessary to have the plates M capable of being adjusted circumferentially a certain distance, in order to have the clamps grasp the flax at the proper point. The flax varies in height some, and hence the necessity for this adjustment. At the inner side of each plate, M, there is a roller, $i^*$, and these rollers serve as bearings for the arms K, as the rollers $e$ move in the parts $h$ of the groove L. At the outer edge of each plate, $c$, there is a roller or shaft, $j$, the bearings of which are attached to the ends of the arms $b$, and at the outer ends of the plates J there are bars, $k$, attached to springs, $l$. These bars compensate for the variation of the thickness of the amount of flax grasped, the variation being considerable according to the condition of the crop. The shafts or rollers $j$ cause the flax to be firmly crimped and grasped, and also admit of the flax being freely discharged upon the platform, when the plates J are forced out from the plates $c$. The arms K also have small rollers, $m$, fitted in them to work under flanges, $n$, at the bottoms of the plates M, and keep the plates J firmly closed against the plates $c$, or rather against the flax between said plates, while the flax is being pulled and deposited upon the platform B. The pulled flax may be raked or discharged from the platform B in any proper manner. This reel works and operates upon the flax in a perfect manner, having no tendency to beat down the standing flax.

Having thus described my invention, what I claim as new, and desire to secure by Letters Patent, is—

1. The rotating reel, provided with fixed radial plates c and movable plates J, arranged so as to operate as clamps, and, as the machine is drawn along, pull the standing flax and deposit it on the platform, substantially as set forth.

2. The cam-shaped grooves L, at the inner sides of the plates M, and the pivoted arms K, to which the plates J are attached, in connection with the rollers e, at the inner ends of the arms working in the grooves L, for the purpose of operating the plates J, substantially as set forth.

3. The shafts j, at the outer ends of the plates c, in connection with the yielding bars k, at the outer ends of the plates J, substantially as and for the purpose specified.

4. The combination of the main frame and platform with the reel, arranged with clamps, to operate as set forth.

JOHN HARRINGTON.

Witnesses:
  R. TATTERSHALL,
  D. W. C. CASTLE.